United States Patent
Miyata et al.

(10) Patent No.: US 8,335,211 B2
(45) Date of Patent: Dec. 18, 2012

(54) COMMUNICATION SYSTEM AND CONTROL SERVER

(75) Inventors: Hiroaki Miyata, Yokohama (JP); Yasuo Kogure, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 12/944,117

(22) Filed: Nov. 11, 2010

(65) Prior Publication Data
US 2011/0228761 A1     Sep. 22, 2011

(30) Foreign Application Priority Data
Nov. 13, 2009   (JP) .................................. 2009-259423

(51) Int. Cl.
*H04L 12/66* (2006.01)

(52) U.S. Cl. ........ 370/352; 370/353; 370/354; 370/355; 370/356; 370/360

(58) Field of Classification Search ........................ None
See application file for complete search history.

(56) References Cited

U.S. PATENT DOCUMENTS

| | | | |
|---|---|---|---|
| 7,558,254 B2* | 7/2009 | Haase et al. .................. | 370/354 |
| 7,623,523 B2* | 11/2009 | Kondou et al. .......... | 370/395.21 |
| 7,764,668 B2* | 7/2010 | Yoshizawa et al. ........... | 370/352 |
| 8,108,516 B2* | 1/2012 | Zmolek .......................... | 709/224 |
| 8,117,311 B2* | 2/2012 | Kidachi et al. ................ | 709/226 |
| 2010/0075673 A1* | 3/2010 | Colbert et al. ............. | 455/435.1 |
| 2011/0317621 A1* | 12/2011 | Nagasawa et al. ............ | 370/328 |

FOREIGN PATENT DOCUMENTS

| | | |
|---|---|---|
| JP | 2006-109316 | 4/2006 |
| JP | 2006-352753 | 12/2006 |
| JP | 2008-219723 | 9/2008 |

* cited by examiner

*Primary Examiner* — Ayaz Sheikh
*Assistant Examiner* — Blanche Wong
(74) *Attorney, Agent, or Firm* — Foley & Lardner LLP

(57) ABSTRACT

When an IP terminal on the Internet side transmits a name resolution request, which requests to resolve the FQDN of a public server connected to a router, to a SIP/DNS server in which SIP and DNS cooperate to manage the status of the data line of the router and when the data communication line status of the router is a disconnect status, a data communication line connection request instruction is transmitted to the router. The router connects the data communication line and notifies the SIP/DNS server about the result. The SIP/DNS server transmits the IP address of the router to the IP terminal as a response.

18 Claims, 16 Drawing Sheets

FIG. 4

DNS NAME MANAGEMENT TABLE ~45

| # | FQDN | IP ADDRESS | DYNAMIC DNS | SIP URI |
|---|------|------------|-------------|---------|
| 1 | www.user-1.aaa.com | IP4=11.0.0.1 | | user-1@.aaa.com |
| 2 | www.user-2.aaa.com | | | |
| 3 | www.user-9.aaa.com | | ○ | |
| 4 | www.user-a.aaa.com | IP4=11.0.0.100 | ○ | |
| m | www.user-n.aaa.com | | | user-N@.aaa.com |
| n | www.user-x.aaa.com | IP4=11.0.0.20 | | |

| | 46 | 461 | 462 | |
|---|---|---|---|---|
| SIP CONNECTION MANAGEMENT TABLE | | | | |
| # | SIP URI | | IP ADDRESS | |
| 1 | user-1@.aaa.com | | IP4=12.0.0.1 | |
| 2 | user-2@.aaa.com | | IP4=12.0.0.2 | |
| 3 | user-9@.aaa.com | | IP4=12.0.0.9 | |
| | | | | |
| m | user-n@.aaa.com | | IP4=12.0.1.1 | 463 |
| n | user-m@.aaa.com | | IP4=12.0.1.2 | |
| | | | | |

FIG. 6A

| | | 47  471 | 472 | 473 |

| SIP USER STATUS MANAGEMENT TABLE | | | |
|---|---|---|---|
| # | SIP URI | STATUS | IP ADDRESS |
| 1 | user-1@.aaa.com | DISCONNECT | |
| 2 | user-9@.aaa.com | CONNECT | IP4=10.0.10.1 |
| 3 | | | |
| | | | |

FIG. 6B

| SIP USER STATUS MANAGEMENT TABLE | | | |
|---|---|---|---|
| # | SIP URI | STATUS | IP ADDRESS |
| 1 | user-1@.aaa.com | DISCONNECT | |
| 2 | user-9@.aaa.com | CONNECT | IP4=10.0.0.1 |
| 3 | user-n@.aaa.com | DISCONNECT | |
| | | | |

| SIP USER STATUS MANAGEMENT TABLE | | | |
|---|---|---|---|
| # | SIP URI | STATUS | IP ADDRESS |
| 1 | user-1@.aaa.com | DISCONNECT | |
| 2 | user-9@.aaa.com | CONNECT | IP4=10.0.0.1 |
| 3 | user-n@.aaa.com | CONNECT | IP4=10.0.1.1 |
| | | | |

| SIP USER STATUS MANAGEMENT TABLE | | | |
|---|---|---|---|
| # | SIP URI | STATUS | IP ADDRESS |
| 1 | user-1@.aaa.com | DISCONNECT | |
| 2 | user-9@.aaa.com | CONNECT | IP4=10.0.0.1 |
| 3 | user-n@.aaa.com | DISCONNECT | |
| | | | |

~476

```
M1
REGISTER sip:server-1.aaa.com SIP/2.0
Via: SIP/2.0/UDP aaa.com:5060;branch=z9hG4bKababab
Max-Forwards: 70                                    M11
From: user-n@aaa.com ⟨sip:user-n@aaa.com⟩ ;tag=123456
To: user-n@aaa.com ⟨sip:user-n@aaa.com⟩
Call-ID: 654321@aaa.com
CSeq: 1 REGISTER
Contact: ⟨sip:user-n@12.0.1.1⟩   M12
Expires: 7200    M13
Contact-Length: 0
```

```
PUBLISH sip:server-1.aaa.com SIP/2.0
Via: SIP/2.0/UDP aaa.com:5060;branch=z9hG4bKababab
Max-Forwards: 70
From: user-n@aaa.com ⟨sip:user-n@aaa.com⟩ ;tag=123456
To: user-n@aaa.com ⟨sip:user-n@aaa.com⟩
Call-ID: 654321@aaa.com
CSeq: 2 PUBLISH
Contact: ⟨sip:user-n@12.0.1.1⟩
Expires: 7200
Contact-Length: 0
Event: disconnect   ~M31
```

```
REFER sip:server-1.aaa.com SIP/2.0
Via: SIP/2.0/UDP aaa.com:5060;branch=z9hG4bKababab
Max-Forwards: 70
From: ⟨sip:user-1.aaa.com⟩ ;tag=789abc
To: user-n@aaa.com ⟨sip:user-n@aaa.com⟩
Call-ID: 654321@aaa.com
CSeq: 10 REFER
Refer-To: ⟨data-line:connect-req⟩    M151
Contact: ⟨sip:user-n@12.0.1.1⟩
Contact-Length: 0
```

```
PUBLISH sip:server-1.aaa.com SIP/2.0
Via: SIP/2.0/UDP aaa.com:5060;branch=z9hG4bKababab
Max-Forwards: 70
From: user-n@aaa.com ⟨sip:user-n@aaa.com⟩ ;tag=123456
To: user-n@aaa.com ⟨sip:user-n@aaa.com⟩
Call-ID: 654321@aaa.com
CSeq: 15 PUBLISH
Contact: ⟨sip:user-n@12.0.1.1⟩
Expires: 7200
Contact-Length: 0
Event: connect;IP4=10.0.1.1    M211
```

COMMUNICATION SYSTEM AND CONTROL SERVER

INCORPORATION BY REFERENCE

The present application claims priority from Japanese application JP-2009-259423 filed on Nov. 13, 2009, the content of which is hereby incorporated by reference into this application.

BACKGROUND OF THE INVENTION

The present invention relates to session control on the Internet and to a communication system, a session control management server, and a connection control method for performing connection processing when a request to connect to a disconnected Internet connection line is received.

Today, widespread use of high-speed access lines such as FTTH (Fiber To The Home) provides a high-speed Internet access environment and, at the same time, communication carriers and ISPs (Internet Service Provider) provide the IP phone service over the Internet.

Although the network configuration differs according to the communication carrier and the ISP, two separate networks are built, one for an Internet connection and the other for the IP phone network, and two IP addresses are assigned to the user, one for an Internet access and the other for an IP phone, to increase the communication quality of the IP phone service.

Therefore, to acquire the IP address for an Internet access and the IP address for an IP phone, a router such as a Broadband Router (BBR) installed in a user's home or a company must perform protocol processing, such as PPP (Point to Point Protocol), PPPoE (PPP over Ethernet) (Ethernet is a registered trademark), or DHCP (Dynamic Host Configuration Protocol), individually for the GW (GateWay) installed on the communication carrier side or the ISP side.

Similarly, for a VPN (VIRTUAL Private Network) connection, protocols such as L2TP (Layer 2 Tunneling Protocol) and IPsec (IP Security Protocol) are used to perform the connection processing.

In the Internet connection service, when a terminal such as a home PC accesses a web server or a mail server on the Internet and, at this time, if a router such as a BBR is connected to the communication carrier or the ISP and has already acquired an IP address, the router transfers the packets immediately. However, if the router is not connected to the communication carrier or the ISP and has not yet acquired an IP address, the router cannot transfer the packets. In this case, the router connects to the communication carrier or the ISP via PPP and, after acquiring an IP address, transfers the packets. After that, when the non-communication monitoring time that is set in advance in the router has elapsed, the router automatically disconnects from the communication carrier or the ISP to prevent an always-on connection state. This processing method prevents a wasteful, long connection and, at the same time, improves security against an attack, such as a DoS attack (Denial of Service attack) from the Internet side, or an unwanted access.

When a public web server is installed, the FQDN (Fully Qualified Domain Name), which can be identified by the URL, and the acquired IP address are registered in the DNS (Domain Name System) server using the dynamic DNS(Dynamic Updates in the Domain Name System) to allow the server to be accessed from the terminals on the Internet side using the URL (Uniform Resource Locator). By dosing so, the public web server may be accessed from the Internet side.

When a public web server is installed, security measures against a DoS attack are taken, for example, by the FW (FireWall), because the public web server is always on to always allow access from the Internet side.

In the IP phone service, VoIP (Voice over IP) communication is performed in which a communication path (session) is first established between the terminals before the communication is started and then voice data is transferred using RTP (RealTime Transport Protocol) packets.

As the primary session control protocols for establishing and disconnecting a session between terminals, the specifications for SIP (Session Initiation Protocol), MGCP (Media Gateway Control Protocol), and H.248 have been prepared. For example, SIP-based session control between terminals is performed primarily via the SIP server.

A SIP message is composed of the start line and the header, via which request information or response information is transferred, and the message body in which the session content is described. For example, SDP (Session Description Protocol) is used for describing the session content, and the other party of the communication is identified by the request URI (Uniform Resource Identifier) described in the start line. During the session establishment process, the RTP packet communication condition between the terminals, such as the protocol for calling the receiver and for transmitting voices and videos, the bit rate, and so on, are determined.

In the IP phone service, an always-on session is maintained in many cases to respond to an incoming message from IP phone terminals on the Internet side.

Several methods are proposed for connecting to the Internet or to a destination terminal through the cooperation of DNS and SIP. For example, JP-A-2006-109316 discloses a technology that, when transmitting an access request from a LAN terminal to the other terminal of the communication, the LAN terminal transmits the request to the GW and, upon receiving the request, the GW performs the name resolution of the other terminal of the communication via DNS. At this time, the GW identifies if the connection destination information included in the query message is an FQDN or a URI such as an IP phone number. If the connection destination information is an FQDN, the GW transfers the query to the DNS server for name resolution and, at the same time, performs the IPsec connection processing for the other terminal of the communication. If the connection destination information is a URI, the GW performs SIP-based connection processing for the other terminal of the communication. In this way, the communication line is connected when an access request is issued from a LAN terminal to the other terminal of the communication.

For example, JP-A-2006-352753 discloses a technology in which, when an access request is made from a PC to a PC at the other end and the application installed in the PC performs the name resolution of the other PC via DNS, the protocol conversion processing program installed in the same PC first performs the DNS-SIP conversion processing and then calls the SIP server to request it to perform the name resolution processing. In this way, the PC performs communication with the other PC of the communication.

For example, JP-A-2008-219723 discloses a technology in which, when an access request is made from a client terminal to a web server and the application installed in the PC performs the name resolution of the PC at the other end via DNS, the session control means installed in the same PC first performs name resolution via the DNS server. If it is determined that the name is not resolved, the session control means requests the SIP service registration server to resolve the name and, in addition, performs the SIP-based connection processing for the web server. In this way, when an access request is made from a client terminal to a web server, the communication line is connected.

SUMMARY OF THE INVENTION

In the Internet connection service, if the data communication line is disconnected at a router when a home PC tries to accesses the Internet, the connection processing may be performed for the GW via PPPoE or IPsec to access the Internet. However, because PPPoE and IPsec are a client-server based protocol and, in addition, the connection processing from the server to the client is not defined, the GW cannot perform the connection processing for the router via PPPoE and IPsec if the data communication line between the router and the GW is disconnected. Therefore, the problem is that access cannot be made from the Internet side.

However, an object of the prior-art technologies disclosed by JP-A-2006-109316, JP-A-2006-352753, and JP-A-2008-219723 is to resolve the name of the terminal at the other end via the DNS server when accessing the terminal at the other end and to connect to the terminal at the other end through the cooperation of DNS and SIP on the assumption that the communication line to the terminal at the other end is connected. Therefore, when the data communication line to the terminal at the other end is disconnected, the problem is that the communication to the terminal at the other end cannot be made even if the IP address is acquired by resolving the name of the terminal at the other end.

In view of the foregoing, it is an object of the present invention to allow access to a public web server when a name resolution request for the public web server is made from a terminal on the Internet side to the DNS even if the data communication line to the router connected to the public web server is disconnected.

An example of a communication system of the present invention comprises a router and a control server, the router accommodating a telephone terminal, an IP terminal, and an application server, wherein the router comprises a first interface to the IP terminal; a second interface to the telephone terminal; a third interface to the application server; and a fourth interface that accommodates a voice communication line and a data communication line connected to the control server, the control server comprises a DNS processing unit that performs processing for establishing a correspondence among a domain name of the application server, a data communication line IP address of the router, and an SIP-URI; a SIP processing unit that performs processing for controlling a session with the router and for establishing a correspondence among session status information on the router, the data communication line IP address, and the SIP-URI; a name management table in which a correspondence among a domain name of the application server, a data communication line IP address of the router, and an SIP-URI is stored; and a status management table in which a correspondence among the session status information on the router, the data communication line IP address, and the SIP-URI is stored wherein, based on destination information included in a name resolution request transmitted from the IP terminal, the DNS processing unit searches the name management table for a SIP-URI corresponding to the destination information, and if the data communication line between the router and the control server is disconnected, the SIP processing unit searches the status management table for the session status information corresponding to the SIP-URI based on the SIP-URI searched for from the name management table, connects a session with the router via a voice communication line if the session status information that has been searched for includes information indicating "disconnect", and transmits a connection request, which requests to connect to the data communication line, to the router.

The communication system may further comprises a connection management table in which a correspondence among a voice communication line IP address of the router and the SIP-URI is stored wherein the SIP processing unit searches the connection management table for a voice communication line IP address of the router corresponding to the SIP-URI and performs the session connection processing with the router for the voice communication line IP address that has been searched for.

Even when a router and a data communication line are disconnected, the control server may transmit a data communication line connection instruction to the router to establish a communication path between a terminal and an application server.

Other objects, features and advantages of the invention will become apparent from the following description of the embodiments of the invention taken in conjunction with accompanying drawings.

BRIEF DESCRIPTION OF THE DRAWINGS

FIG. 4 is a diagram showing an example of the configuration of a DNS name management table.

FIG. 5 is a diagram showing an example of the configuration of a SIP connection management table.

FIGS. 6A-6D are diagrams showing examples of the configuration of a SIP user status management table.

FIG. 13 is a diagram showing an example of the description of a REFER message transmitted from the SIP/DNS server.

FIG. 14 is a diagram showing an example of the description of a PUBLISH message transmitted from the router.

DETAILED DESCRIPTION OF THE INVENTION

Figure 1:
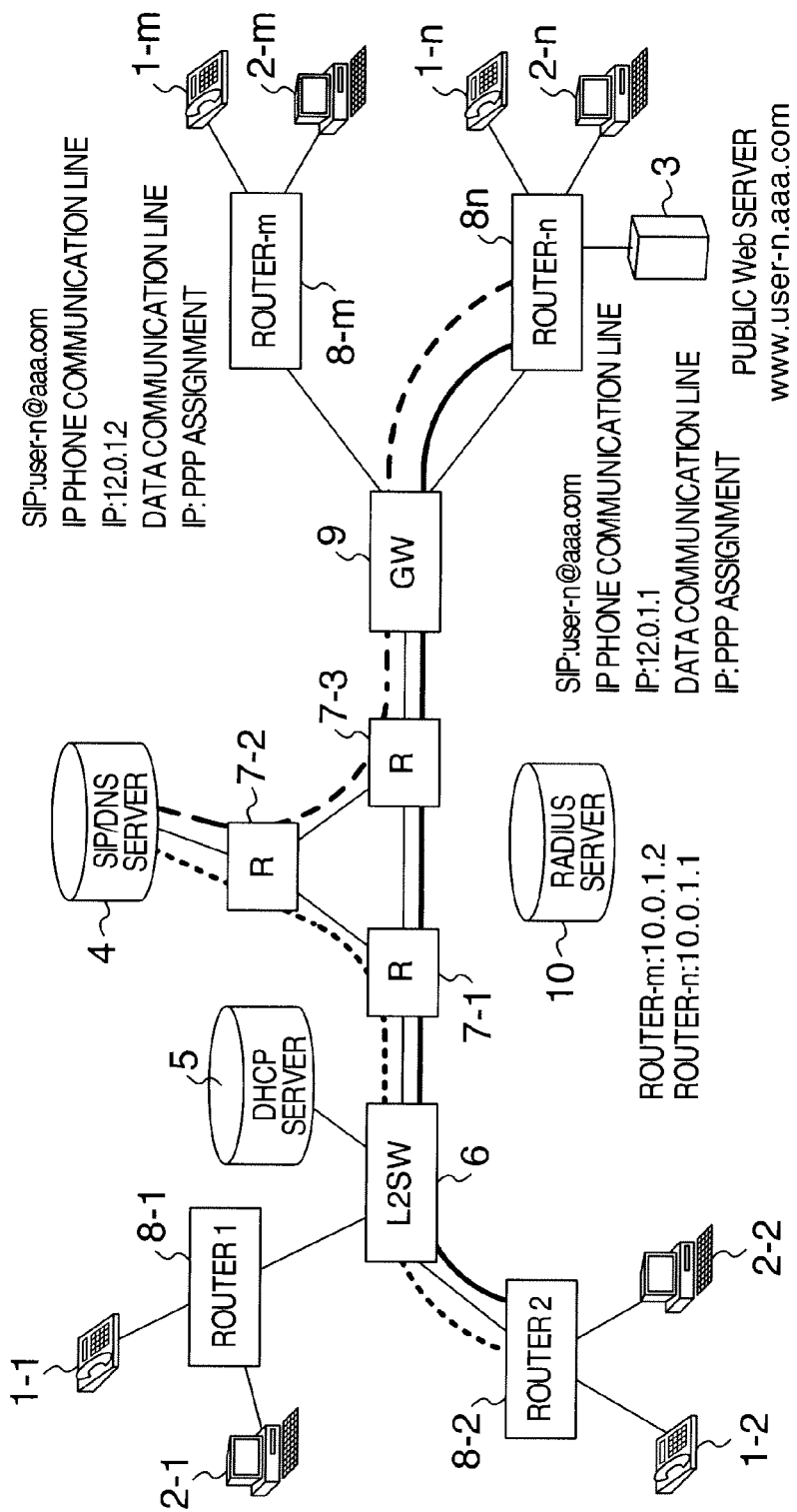
FIG. 1 is a diagram showing an example of the configuration of a network.

A mode for carrying out the present invention will be described below. In a network where a router, which has the SIP-based IP phone communication function and the data communication function and is connected to an application server, and a session control (SIP/DNS) server, which has the SIP server and the DNS server cooperation processing function, are connected, the router notifies the control (SIP/DNS) server about the information on the IP phone communication line and the data communication line. In notifying about the information on the lines, a registration message such as REGISTER is used to notify about the information on the IP phone communication line. A status notification message and a status change notification message, such as PUBLISH, UPDATE, SUBSCRIBE, and NOTIFY, are used to notify about the information on the data communication line.

The control (SIP/DNS) server has a DNS name management table, a SIP connection management table, and a SIP user status management table.

The DNS name management table, provided primarily for the DNS server function to establish a correspondence between a domain name and an IP address, at least stores IP address information for a domain name (usually, FQDN). In addition, a dynamic DNS may be included in this table to manage registration permission information. Instead of an IP address, SIP URI information may be added. In this case, this table is used by the SIP server to manage the connection status and the IP address of a public server specified by the FQDN.

The SIP connection management table, provided primarily for the SIP server function to control a session, manages IP addresses for SIP URIs.

The SIP user status management table manages the status, either disconnect or connect, of a data communication line for a SIP URI and an IP address used in the connect status.

The status information in the SIP user status management table is set or updated when the status of the data communication line of a router is changed. In this case, when disconnected from the control (SIP/DNS) server, the router transmits the PUBLISH message to notify about the disconnect state and, when connected to the control (SIP/DNS) server, the router transmits the PUBLISH message to notify about the connect status and the IP address. When the PUBLISH message is received from the router, the control (SIP/DNS) server sets or updates the status item in the SIP user status management table using the notified connection status.

The following describes the sequence in which a terminal accesses an application server connected to a router whose data communication line is disconnected. The terminal requests the control (SIP/DNS) server to resolve the name specified by an FQDN. The control (SIP/DNS) server searches the DNS name management table and, if a SIP URI is registered for the FQDN, searches the SIP user status management table to check the information in the status item. If the status is "disconnect" as a result of the checking, the control (SIP/DNS) server makes a SIP-based session connection to the router. After the connection to the router is completed, the control (IPS/DNS) server transmits a data communication line connection request via the transfer of a connection request message using REFER or via another line connection request message. The router performs the data communication line connection processing according to the connection instruction by the REFER message received from the SIP/DNS server. When the connection of the data communication line is completed and the status becomes the connect status, the PUBLISH message is transmitted to the control (SIP/DNS) server to notify about the connect status and the IP address.

The control (SIP/DNS) server extracts the IP address notified by the router and transmits a notification, in which the IP address corresponding to the FQDN is set in a response message, to the terminal that issued the name resolution request. The sequence described above allows the communication between the terminal, which issued the name resolution request, and the application server connected to the router to be started.

An embodiment of the present invention will be described in detail below with reference to the drawings.

FIG. 1 is a diagram showing an example of the configuration of a network.

A network comprises multiple telephone terminals 1 (1-1 to 1-n), multiple IP terminals 2 (2-1 to 2-n), a public web server (application server) 3, a SIP/DNS server (control server) 4, a DHCP server 5, an L2SW 6, core routers (R) 7 (7-1 to 7-3), routers 8 (8-1 to 8-n), a GW 9 that accommodates routers, and a RADIUS server 10. When the telephone terminals 1 communicate with each other, a registration is first made from the router 8 to the SIP/DNS server 4. Next, to make a call from the telephone terminal 1-2 to the telephone terminal 1-n, SIP messages are transferred for connection control between the router 8-2 and the router 8-n via the SIP/DNS server 4 and, after the session connection is completed, a call is made between the telephone terminal 1-2 and the telephone terminal 1-n. In this case, because voice data is transferred between the router 8-2 and the router 8-n as an RTP packet, the router 8 converts the voice data, received from the telephone terminal 1, to an RTP packet and then transmits the converted RTP packet. Similarly, the router 8 converts a received RTP packet to voice data and transmits the converted voice data to the telephone terminal 1. When the IP terminal 2-2 accesses an application server connected to the Internet, for example, the public web server 3 connected to the router 8-n, via the router 8-2, the IP terminal 2-2 performs name resolution for the SIP/DNS server 4, acquires the IP address of the public web server 3 notified by the SIP/DNS server 4 and, then, access the public web server 3. Note that the public web server 3 is an application server accessible to an IP terminal via the Internet. The GW 9 has the function to terminate the data communication with the router 8. The RADIUS server 10 performs user authentication when the router 8 makes a connection via PPP and assigns and manages an IP address used by the router 8 on the data communication line.

Figure 2:
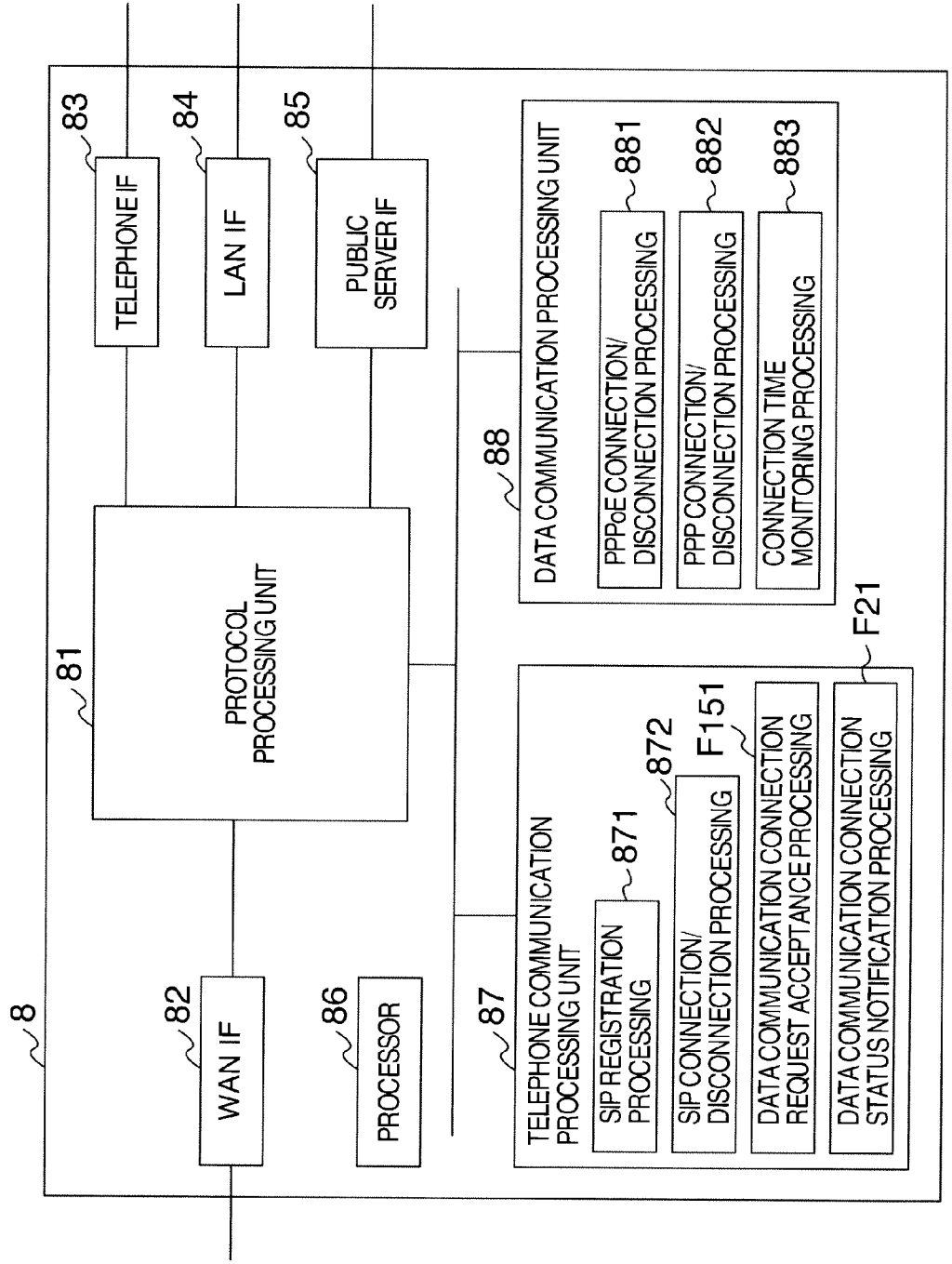
FIG. 2 is a diagram showing an example of the block configuration of the main part of a router.

FIG. 2 is a block configuration diagram showing the main part of the router 8.

Figure 3:
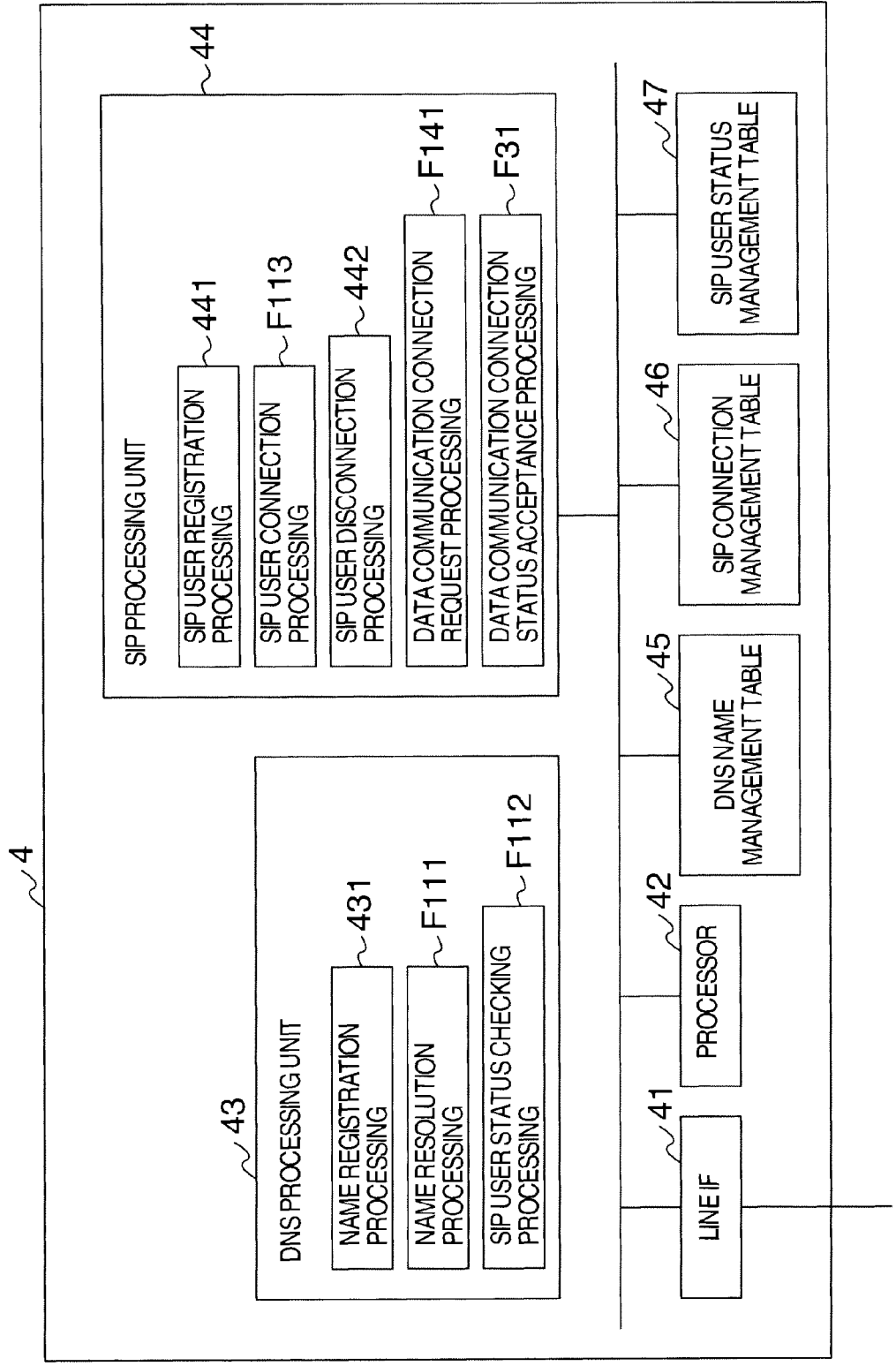
FIG. 3 is a diagram showing an example of the block configuration of the main part of a SIP/DNS server.

The router 8 mainly comprises a protocol processing unit 81, a WAN IF(interface) 82 connected to the line (IP network line) on the GW 9 side, a telephone IF 83 connected to the telephone terminal 1, a LAN IF 84 connected to the IP terminal 2, a public server IF 85 connected to an application server such as the public web server 3, a processor 86, a telephone communication processing unit 87, and a data communication processing unit 88. The protocol processing unit 81 primarily identifies a packet if it is a control packet such as a SIP or PPP control packet or a data packet such as an RTP or HTTP data packet. If it is determined as a result of the identification that the packet is a control packet, the protocol processing unit 81 transfers data between the WAN IF 82 and the processor 86; if is it determined that the packet is a data packet, the protocol processing unit 81 transfers data to and from the IFs (83-85). The processor 86 controls the telephone communication (voice communication), such as SIP, under control of the telephone communication processing unit 87. The telephone communication processing unit 87 includes a processing unit 871 that performs SIP registration processing, a processing unit 872 that performs SIP connection/disconnection processing, a processing F 151 that performs data communication connection request acceptance processing, and a processing unit F21 that performs data communication connection status notification processing. The processor 86 controls the data communication connection such as PPP under control of the data communication processing unit 88. The data communication processing unit 88 includes a processing unit 881 that performs PPPoE connection/disconnection processing, a processing unit 882 that performs PPP connection/disconnection processing, and a processing unit 883 that performs connection time monitoring processing. The WAN interface checks the line on the GW 9 side if the line is an IP phone connection (voice communication) line or a data communication line. For an IP phone line, the registration state of the SIP URI and the IP address in the control server is maintained, for example, by the refresh operation to allow a call to be transmitted to, and a call to be received from, the telephone terminal 1 at the other end. A data communication line is PPP-connected when an Internet access is received from the IP terminal 2 and, when the connection time monitoring function detects that the connection duration time has reached a predetermined elapsed time or that the non-communication time has reached a predetermined time, the PPP-connection is disconnected. FIG. 3 is a block configuration diagram showing the main part of the SIP/DNS server 4.

The SIP/DNS server 4 mainly comprises a line IF(interface) 41, a processor 42, a DNS processing unit 43, a SIP processing unit 44, a DNS name management table 45, a SIP connection management table 46, and a SIP user status management table 47.

The processor 42 performs DNS control processing under control of the DNS processing unit 43. The DNS processing unit 43 comprises a processing unit 431 that performs name registration processing, a processing unit F111 that performs name resolution processing, and a processing unit F112 that performs SIP user status checking processing. The processor 42 also controls the telephone communication (voice communication) such as SIP under control of the SIP processing unit 44. The SIP processing unit 44 includes a processing unit 441 that performs SIP user registration processing, a processing unit F113 that performs SIP user connection processing, a processing unit 442 that performs SIP user disconnection processing, a processing unit F141 that performs data communication connection request processing, and a processing unit F31 that performs data communication connection status acceptance processing.

FIG. 4 is a diagram showing the table configuration of the DNS name management table 45 that manages FQDNs, which are registered in the SIP/DNS server 4 by the processing unit 431 that performs name registration processing and also manages the information on the data communication line IP addresses.

The DNS name management table 45 stores the correspondence among the information on an FQDN 451, an IP address 452, a dynamic DNS 453, and a SIP URI 454. For example, as shown in #2 in the DNS name management table 45, the processing unit 431, which performs the name registration processing, registers in advance the relation between the FQDN, assigned to the public web server 3, and the data communication line IP address, assigned to the public web server 3 or to the router 8 to which the public web server 3 is connected, into the FQDN 451 and the IP address 452. And, as shown in #1 in the DNS name management table 45, the processing unit 431 registers in advance the relation between the FQDN, assigned to the public web server 3, and the SIP URI, assigned to the router 8 to which the public web server 3 is connected, into the IP address 452 and the SIP URI 454. In addition, when the dynamic DNS 453 is set, the processing unit 431 performs dynamic DNS processing to update the DNS name management table 45 by extracting the FQDN and the data communication IP address, which are notified by the router 8 and are set in the dynamic DNS message, and by dynamically setting the extracted data communication IP address in the IP address 452 corresponding to the FQDN.

FIG. 5 is a diagram showing the table configuration of the SIP connection management table 46 that manages the SIP URI of a SIP user, which is registered in the SIP/DNS server 4 by the processing unit 441 that performs the SIP user registration processing, and the information on a voice communication line IP address.

The SIP connection management table 46 stores the correspondence between information on a SIP URI 461 and a voice communication line IP address 462.

FIGS. 6A-6D are diagrams showing the table configuration of the SIP user status management table 47 that manages the information such as a SIP user status and a data communication line IP address, which are registered into the SIP/DNS server 4 by the processing unit F112 that performs SIP user status checking processing.

The SIP user status management table 47 stores the correspondence among information on a SIP URI 471, a status 472, and a data communication line IP address 473.

In the figures, reference numbers (#) are shown in the tables. Each of FIGS. 6A-6D will be described later.

Figures 7, 8:
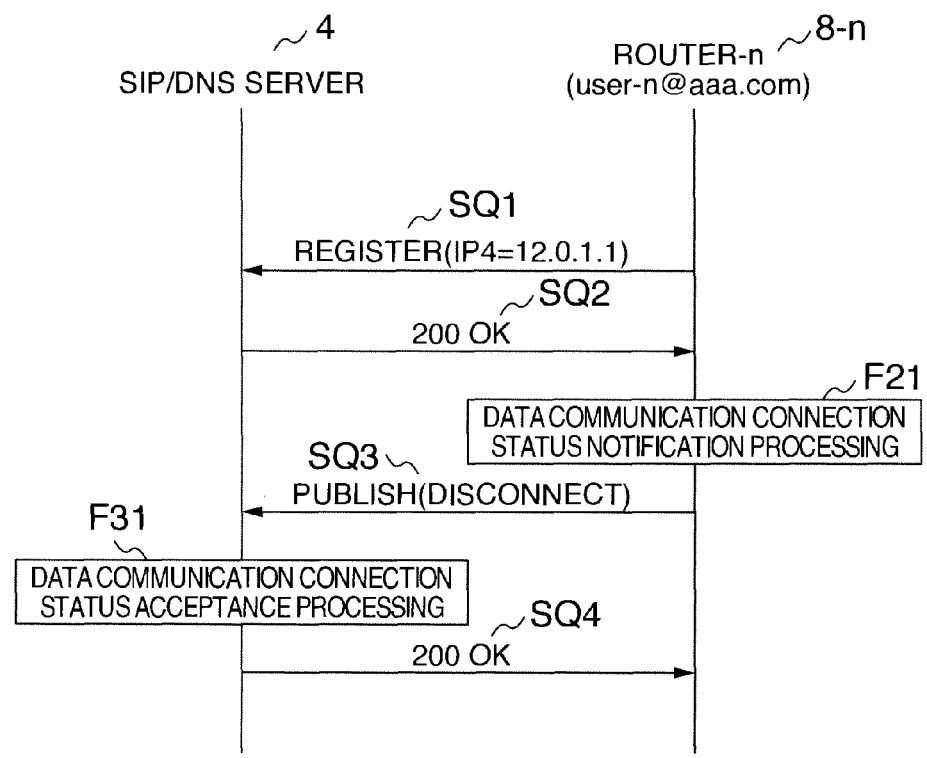
FIG. 7 is a diagram showing an example of the sequence in which IP phone terminal information is registered in the SIP server.
FIG. 8 is a diagram showing an example of the description of a REGISTER message.
Figure 11:
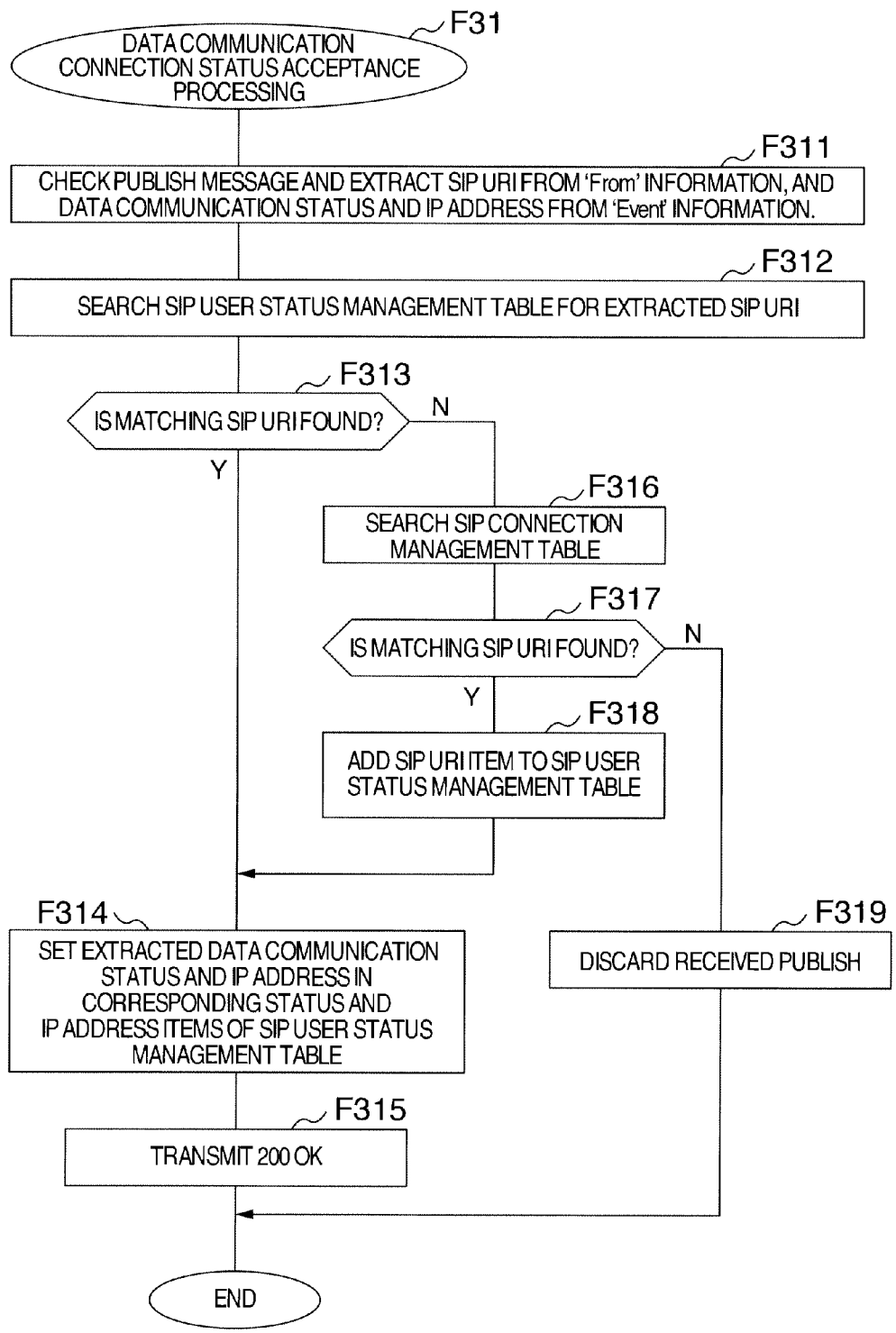
FIG. 11 is a diagram showing an example of the data communication connection status acceptance processing flow in the SIP/DNS server.
Figure 12:
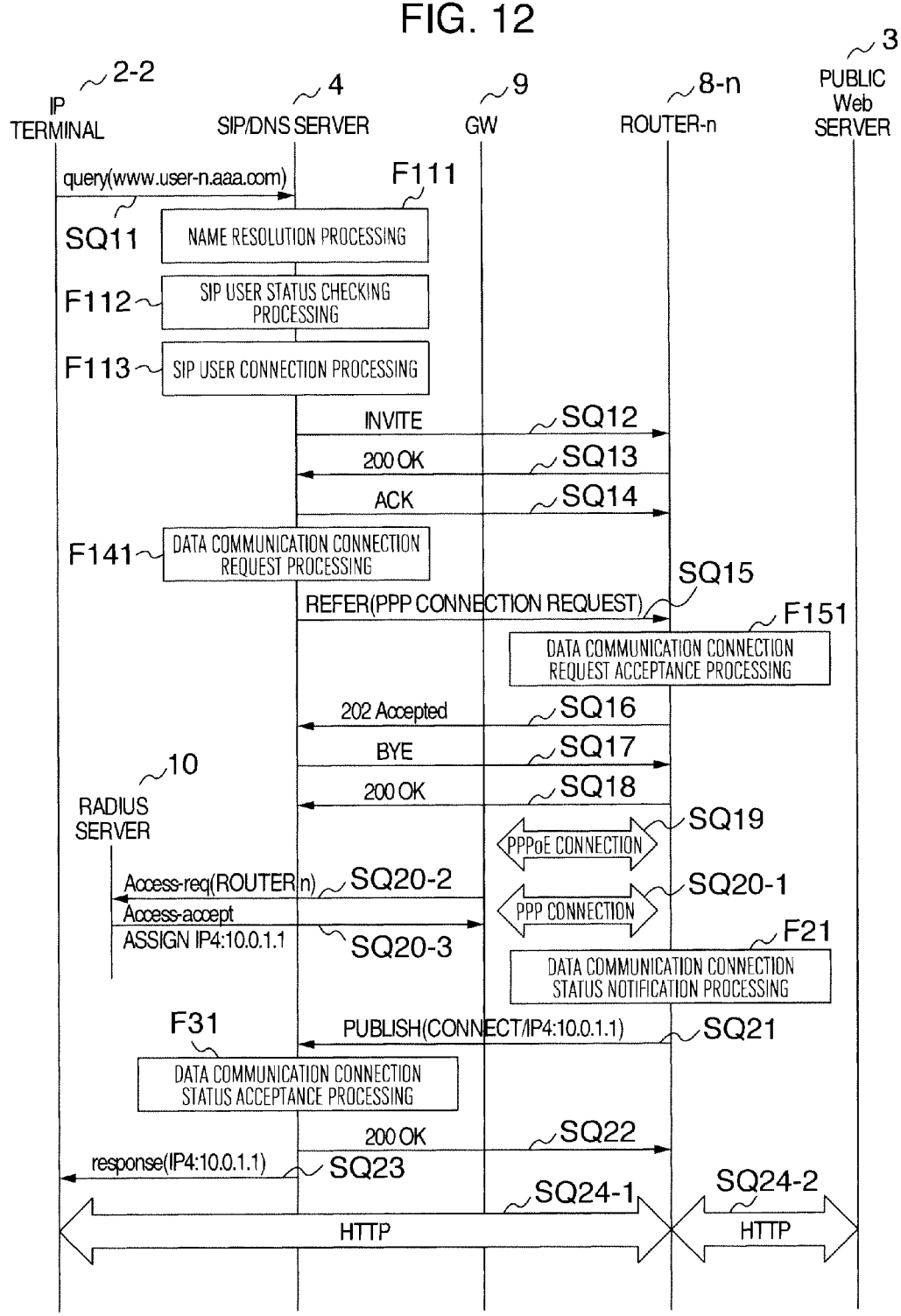
FIG. 12 is a diagram showing an example of the sequence in which a terminal on the Internet side connects to a public web server.
Figure 15:
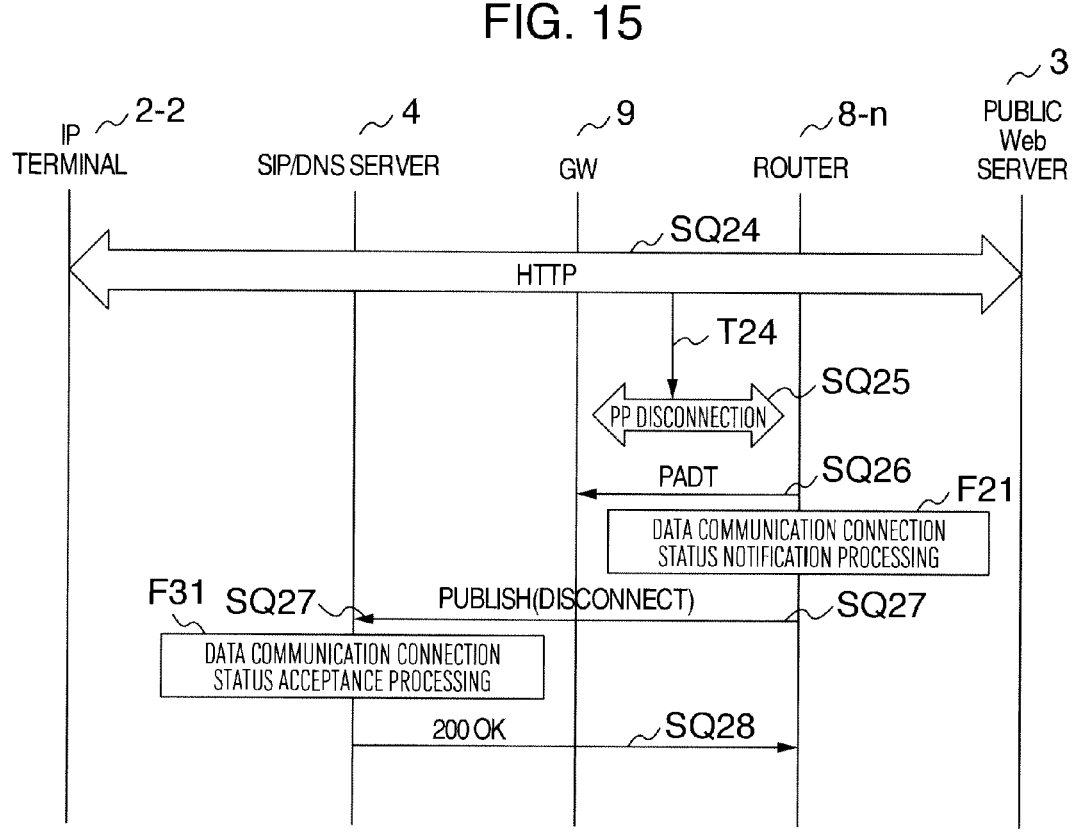
FIG. 15 is a diagram showing an example of the sequence in which the router performs the disconnection processing.

With reference to the sequence diagrams shown in FIG. 7, FIG. 12, and FIG. 15, the SIP message diagrams shown in FIG. 8, FIG. 10, FIG. 13, and FIG. 14, and the flowcharts shown in FIG. 9, FIG. 11, and FIGS. 16-20, the following describes the DNS control processing, the SIP control processing, and the cooperation processing via the SIP/DNS server 4 that are performed when the IP terminal 2-2 accesses the public web server 3.

FIG. 7 is a diagram showing an example of the sequence in which IP terminal information is registered in the SIP/DNS server.

After the router 8-*n* is initialized by a power-on operation or a reset operation, the telephone communication processing unit 87 of the router 8-*n* causes the processing unit 871, which performs the SIP registration processing, to transmit the registration request REGISTER (SQ1) to the SIP/DNS server 4. FIG. 8 is a diagram showing an example of the description of a REGISTER message.

In response to REGISTER (registration request) (SQ1), the SIP/DNS server 4 extracts the SIP URI and the voice communication line IP address from "From:user-n@aaa.com..." (M11) and "Contact:<sip:user-n@12.0.1.1>" (M12) which are stored in the REGISTER message (M1) shown in FIG. 8, and registers the extracted SIP URI and the IP address, for example, in #m(463) of the SIP connection management table 46 shown in FIG. 5. After that, the SIP/DNS server 4 transmits 200 OK (SQ2) to the router 8-*n*.

In addition, when the expiration time "Expires:7200" (M13) specified in the REGISTER message (M1) shown in FIG. 8 gets near, the router 8-*n* regularly transmits REGISTER (SQ1) to the SIP/DNS server 4 to perform the refresh processing for updating the registration of #m(463) in the SIP connection management table 46 in the SIP/DNS server 4. Each time this REGISTER message is received, the SIP processing unit re-registers the voice communication line IP address and the SIP-URI to maintain the status of the voice communication line.

Figures 9, 10:
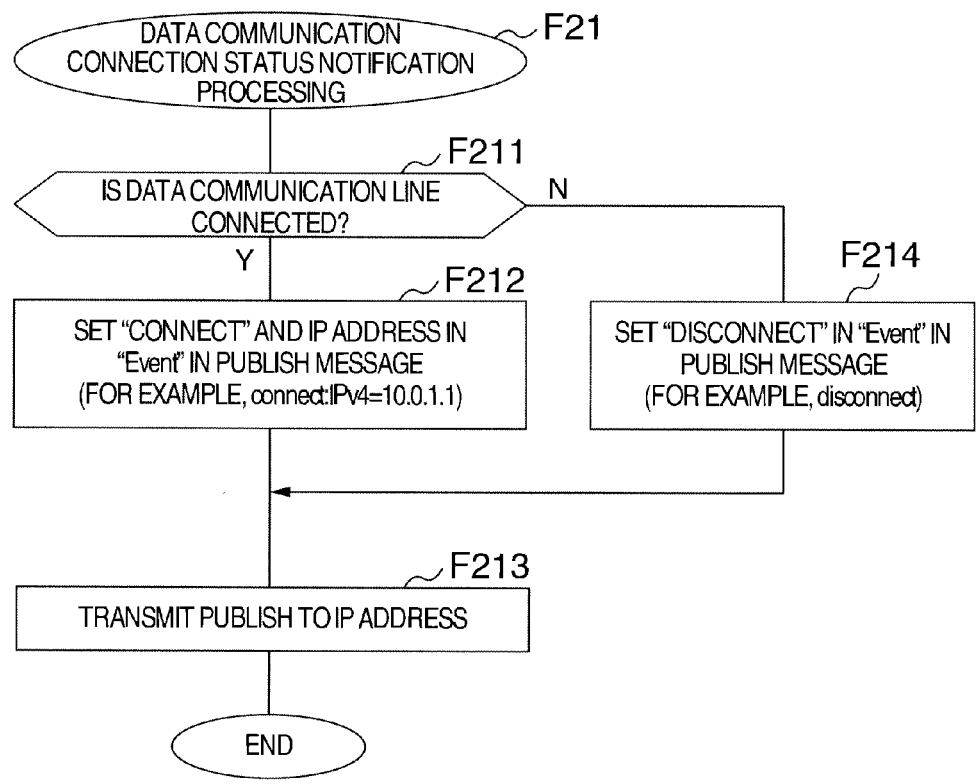
FIG. 9 is a diagram showing an example of the data communication connection status notification processing flow in the router.
FIG. 10 is a diagram showing an example of the description of a PUBLISH message.

FIG. 9 is a diagram showing an example of the data communication connection status notification processing flow in the router.

FIG. 10 is a diagram showing an example of the description of a PUBLISH message.

After the router is initialized by a power-on operation or a reset operation or when a status change in the data communication line is detected, the telephone communication processing unit 87 of the router 8-$n$ causes the processing unit F21 to perform the data communication connection status notification processing. In the data communication connection status notification processing (indicated by F21) shown in FIG. 9, the processing unit F21 checks if the data communication line is connected or disconnected (F211). If the data communication line is disconnected (N) because the power is turned on or the connection monitoring time processing 883 is performed, the PUBLISH message is transmitted to the SIP/DNS server 4 as PUBLISH (disconnect) (SQ3).

If the data communication line is disconnected, the status information (for example, "Event: disconnect" indicated by M31) is set in the PUBLISH message (M3) shown in FIG. 10 and the PUBLISH message (M3) is transmitted to the SIP/DNS server 4 (F213). The PUBLISH message (M3) is transferred to the SIP/DNS server 4 as PUBLISH (disconnect) (SQ3).

If the data communication line is connected (Y) in step F211, the connect status and the data communication line IP address, assigned to the data communication line, are set in the status information (for example, information stored in the Event field) in the PUBLISH message (F212).

FIG. 11 is a diagram showing an example of the data communication connection status acceptance processing flow in the SIP/DNS server 4.

When PUBLISH (disconnect) (SQ3) is received, the SIP processing unit 44 of the SIP/DNS server 4 performs the data communication connection status acceptance processing (indicated by F31). In the data communication connection status acceptance processing (indicated by F31), the SIP processing unit 44 checks the received PUBLISH message (M3) and extracts the SIP UPI information "user-n@aaa.com" from the transmission source information (From field), and the information about the data communication line disconnection status "disconnect" and the data communication line IP address "None" (M31) from the status information (Event field) (F311). The SIP processing unit 44 searches the SIP URI column 471 of the SIP user status management table 47, shown in FIG. 6A, for the extracted SIP URI "user-n@aaa.com" (F312). If a matching SIP URI is not found (N) as a result of the search (F313), the SIP processing unit 44 searches the SIP URI column 461 of the SIP connection management table 46 to check if the SIP URI "user-n@aaa.com" is registered as a SIP user (F316). If a matching SIP URI is found (Y) as a result of the search (F317), the SIP processing unit 44 registers the SIP URI "user-n@aaa.com" in the SIP URI 471 of #3(474) of the SIP user status management table 47 (F318) as shown in FIG. 6B and, in addition, sets "disconnect" in the status 472 and "None" in data communication line IP address (F314).

If a matching SIP URI is found in step F313 (Y), the SIP processing unit 44 updates items in the SIP user status management table 47, that is, the status 472 and the data communication line IP address 473, based on the extracted information (F314). After that, the SIP processing unit 44 transmits the 200 OK message to the router 8-$n$ as shown by SQ4 in FIG. 7 (SQ4).

If a matching SIP URI is not found (N) in step F317, the SIP processing unit 44 discards the received PUBLISH message (SQ3) judging that the message is invalid (F319).

The 200 OK message is transferred to the router 8-$n$ as 200 OK(SQ4).

FIG. 12 is a diagram showing an example of the sequence in which the SIP/DNS server 4 transmits a connection request to the router 8-$n$ to establish a data communication line when the IP terminal 2-2 accesses the public web server 3.

To access the public web server 3, the IP terminal 2-2 sets the FQDN "www.user-n.aaa.com" in a DNS query message, which is a request message for the name resolution processing, as the name to be resolved and transfers the query message "query(www.user-n.aaa.com" (SQ11) to the SIP/DNS server 4. When the query (SQ11) is received, the DNS processing unit 43 of the SIP/DNS server 4 performs the name resolution processing (F111).

Figure 16:
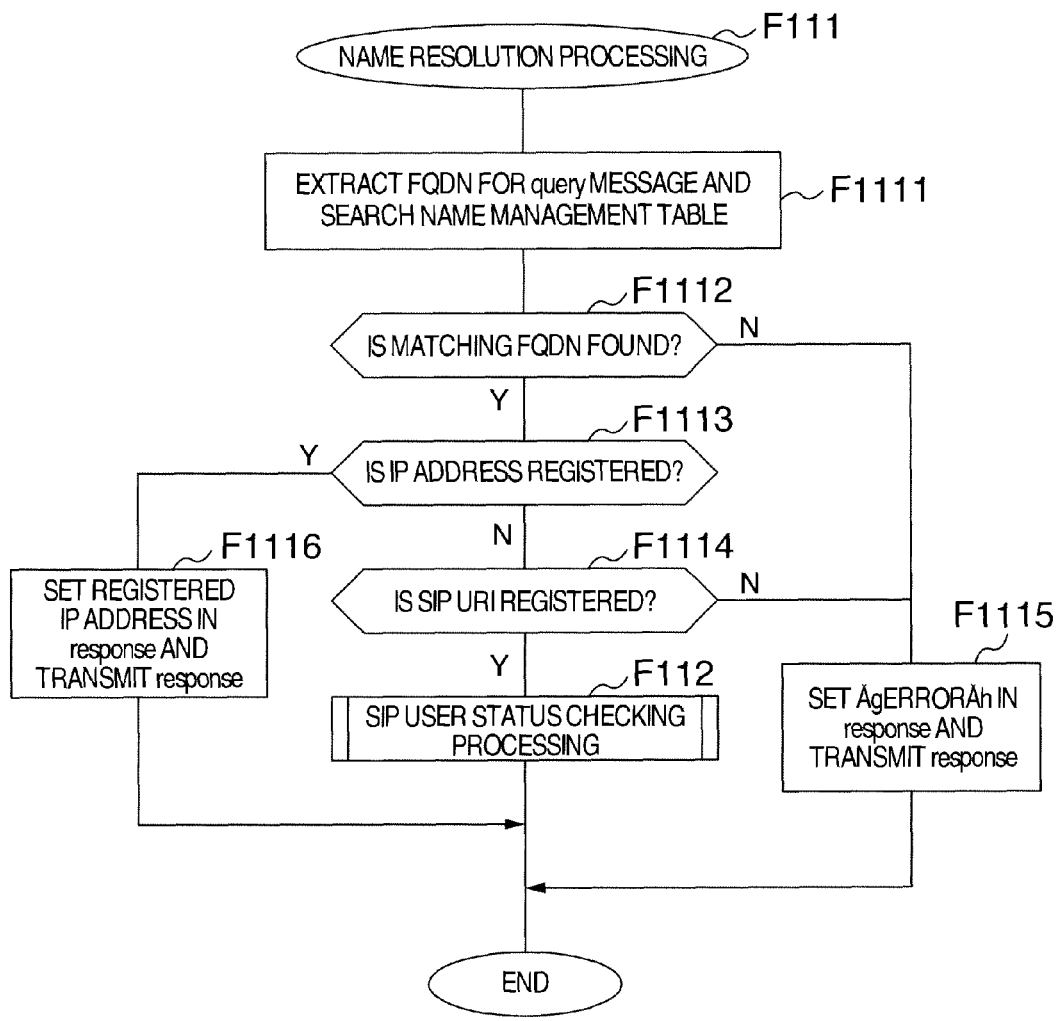
FIG. 16 is a diagram showing an example of the name resolution processing flow in the SIP/DNS server.

FIG. 16 is a diagram showing an example of the name resolution processing flow in the SIP/DNS server.

When the query (SQ11) is received, the DNS processing unit 43 of the SIP/DNS server 4 performs the name resolution processing (F111). The DNS processing unit 43 extracts the destination information (FQDN "www.user-n.aaa.com") from the received query message and searches the FQDN column 451 of the DNS name management table 45 for matching information (F1111). If a matching FQDN is found (Y) as a result of the search (F1112), the DNS processing unit 43 checks if an IP address is registered, for example, in the IP address 452 in #m(455) (F1113) and, if no address is registered (N), checks if a SIP URI is registered in the SIP URI (454) (F1114). If a SIP URI is registered (Y), the DNS processing unit 43 performs the SIP user status checking processing (F112) using the SIP URI "user-n@aaa.com" that is registered.

If a matching FQDN is not found (N) in step F1112, the DNS processing unit 43 sets "error" in the response message to be transmitted to the IP terminal 2-2 and transmits the response message (F1115).

If an IP address is registered (Y) in step F1113, the DNS processing unit 43 sets the "registered IP address" in the response message to be transmitted to the IP terminal 2-2 and transmits the response message (F1116).

Similarly, if a SIP URI is not registered (N) in step F1114, the DNS processing unit 43 sets "error" in the response message to be transmitted to the IP terminal 2-2 and transmits the response message (F1115).

Figure 17:
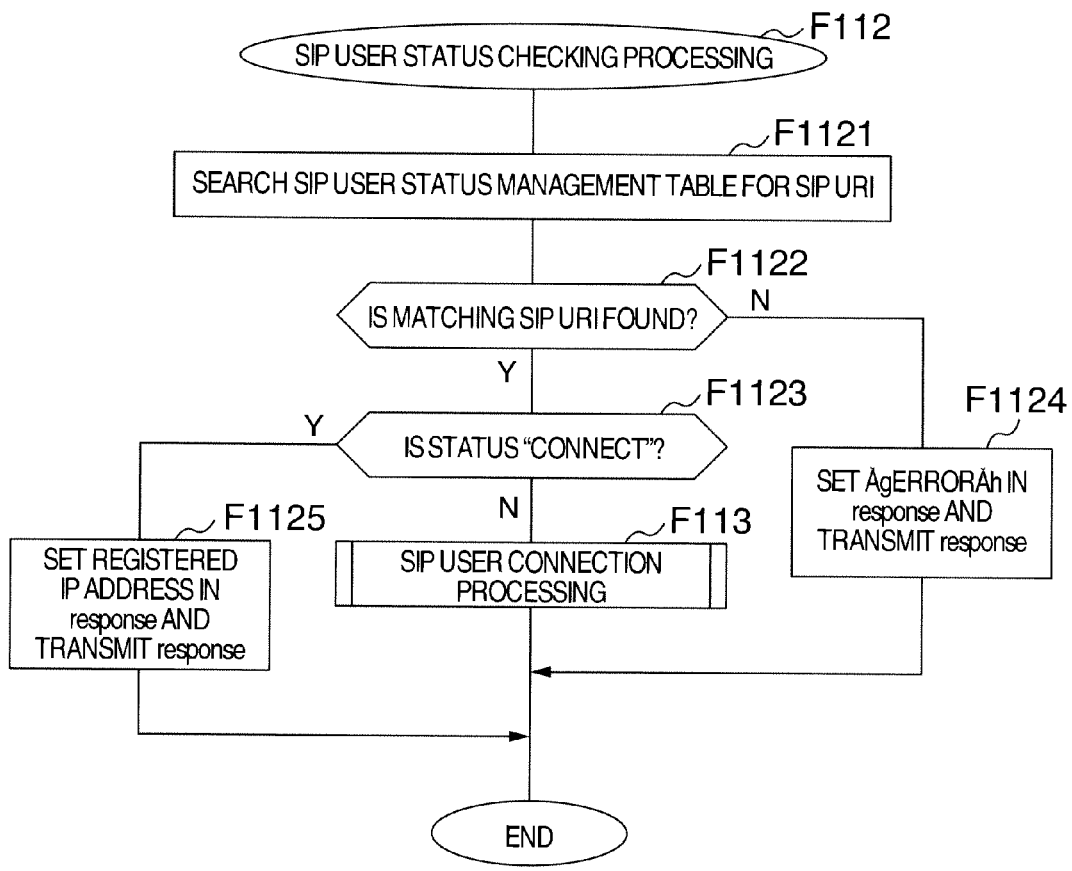
FIG. 17 is a diagram showing an example of the SIP user status checking processing flow in the SIP/DNS server.

FIG. 17 is a diagram showing an example of the SIP user status checking processing flow in the SIP/DNS server.

The DNS processing unit 43 searches the SIP URI column 471 of the SIP user status management table 47 for the SIP URI "user-n@aaa.com" (F1121). If a matching SIP URI is found (Y) as a result of the search (F1122), the DNS processing unit 43 checks the status of #3(474) in FIG. 6B (F1123) and, if the status is "disconnect" (N), performs the SIP user connection processing (F113).

If a matching SIP URI is not found (N) in step F1122, the DNS processing unit 43 sets "error" in the response message to be transmitted to the IP terminal 2-2 and transmits the response (F1124).

If the status is "connect" (Y) in step F1123, the DNS processing unit 43 sets the "registered IP address" in the response message to be transmitted to the IP terminal 2-2 and transmits the response (F1125).

Figure 18:
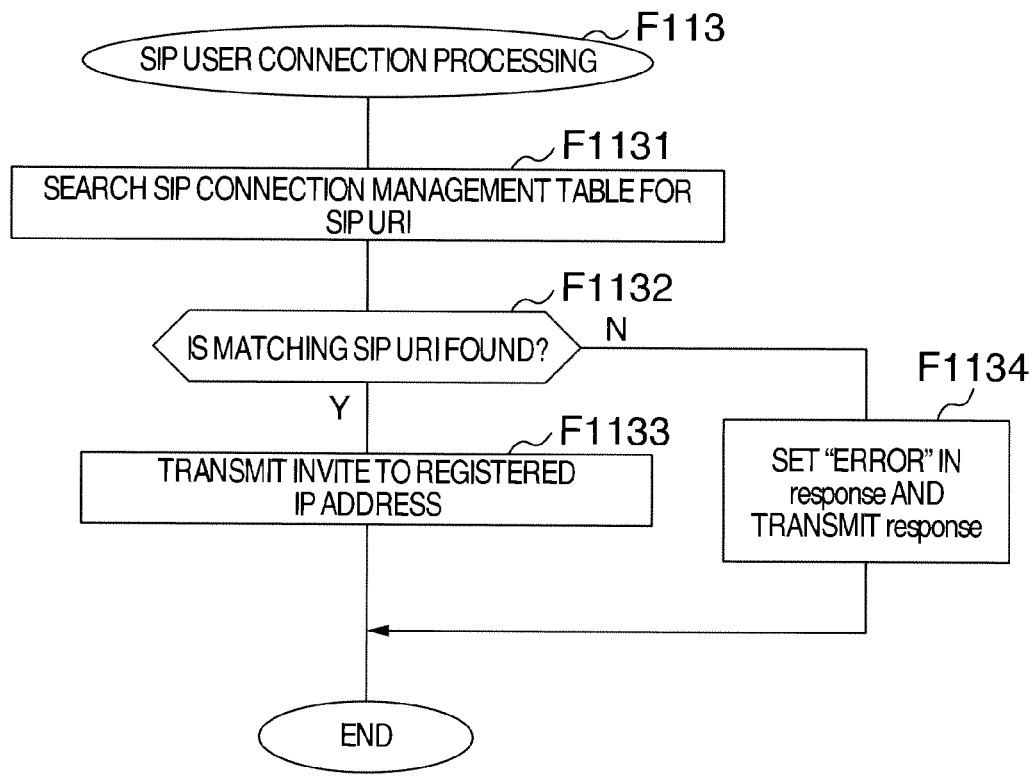
FIG. 18 is a diagram showing an example of the SIP user connection processing flow in the SIP/DNS server.

FIG. 18 is a diagram showing an example of the SIP user connection processing flow in the SIP/DNS server.

The SIP processing unit 44 searches the SIP URI column 461 of the SIP connection management table 46 for the SIP URI "user-n@aaa.com" (F1131). If a matching SIP URI is found (Y) as a result of the search (F1132), the SIP processing unit 44 transmits an INVITE message (F1133) to the voice line IP address "IP4=12.0.1.1" registered in the voice line IP address 462 of #m(463) in FIG. 5, that is, to the router 8-*n*, and performs the connection processing to connects to the router 8-*n*.

If a matching SIP URI is not found (N) in step F1132, the DNS processing unit 43 sets "error" in the response message to be transmitted to the IP terminal 2-2 and transmits the response (F 1124).

The INVITE message is transferred to the router 8-*n* as INVITE (SQ12).

If the received INVITE (SQ12) is a message addressed to the router 8-*n* and its content is valid, the router 8-*n* transfers 200 OK (SQ13) to the SIP/DNS server 4.

If the received status code 200 OK (SQ13) is a code addressed to the SIP/DNS server 4 and its content is valid, the SIP/DNS server 4 transfers ACK (SQ14) to the router 8-*n*.

Figure 19:
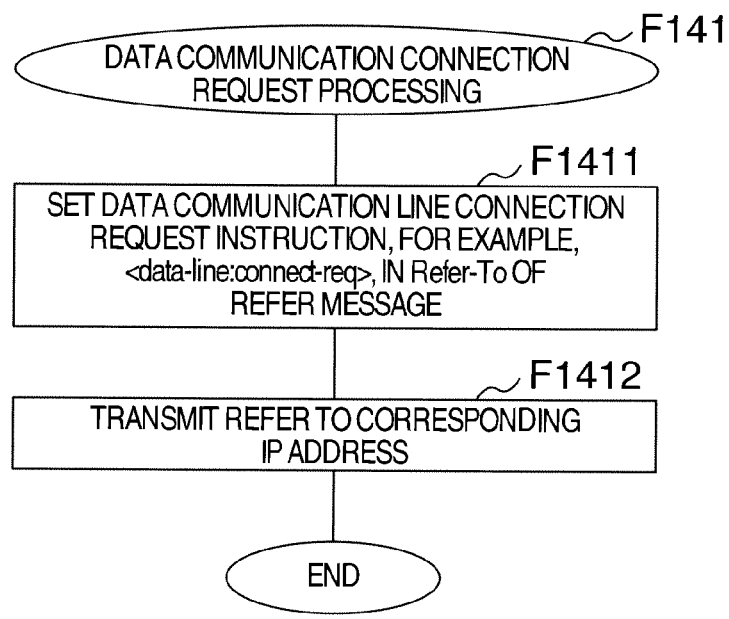
FIG. 19 is a diagram showing an example of the data communication connection request processing flow in the SIP/DNS server.

FIG. 19 is a diagram showing an example of the data communication connection request processing flow in the SIP/DNS server.

FIG. 13 is a diagram showing an example of the description of a REFER message.

After connected to the router 8-*n*, the SIP/DNS server 4 performs the data communication connection request processing (indicated by F141). To request a PPP connection to the router 8-*n* over the data communication line, the SIP processing unit 44 sets "Refer-To:<data-line:connect-req>" (M151) in the Refer-To field of the REFER message (M15) to be transmitted to the router 8-*n* as shown in FIG. 13 (F1411) and transmits the REFER message (M15) to the router 8-*n* (8-*n*) (F1412).

The REFER message (M15) is transferred to the router 8-*n* as REFER (PPP connection request) (SQ15).

Figure 20:
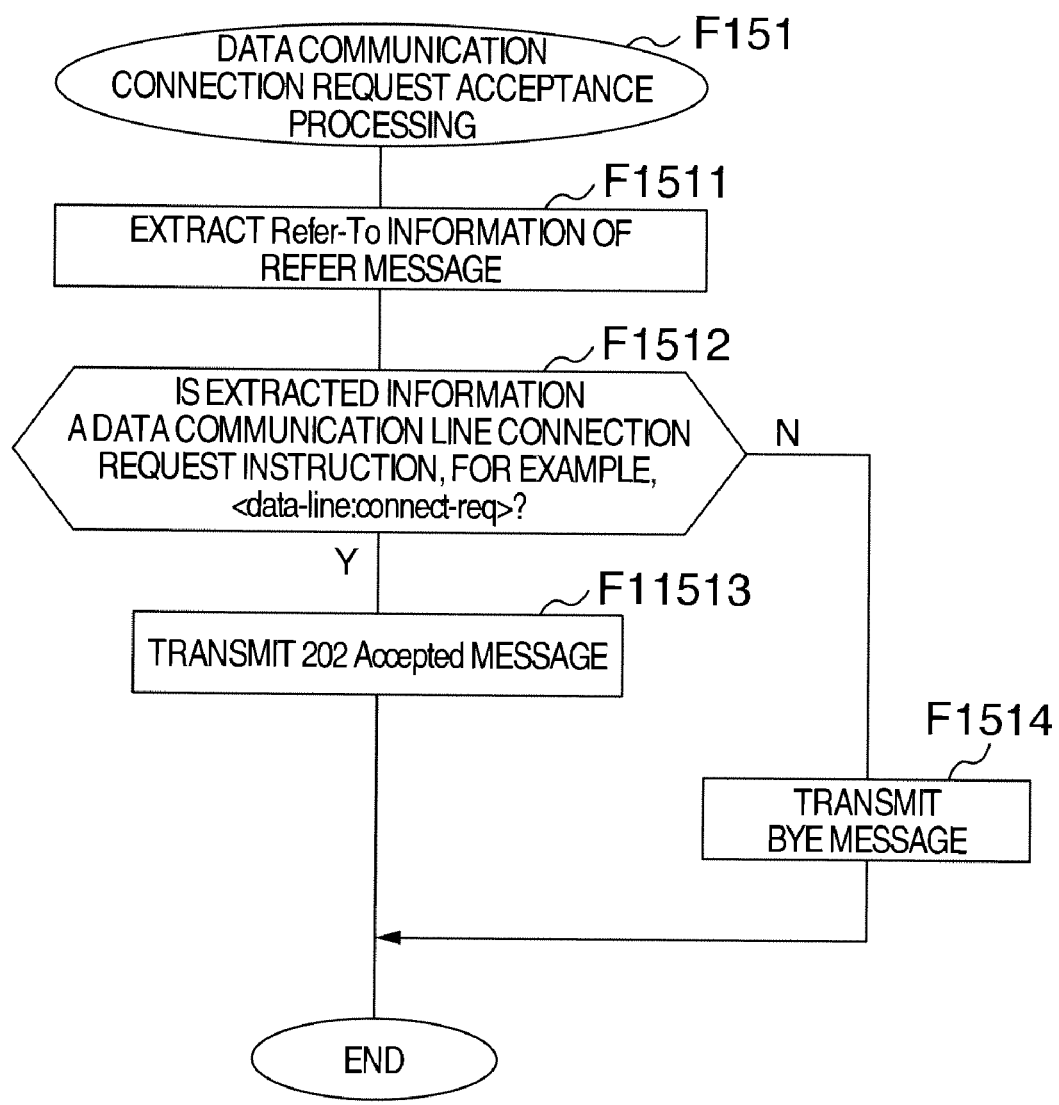
FIG. 20 is a diagram showing an example of the data communication connection request acceptance processing flow in the router.

FIG. 20 is a diagram showing an example of the data communication connection request acceptance processing flow in the router.

When REFER (SQ15) is received, the telephone communication processing unit 87 in the router 8-*n* performs the data communication connection request acceptance processing (indicated by F151). The telephone communication processing unit 87 extracts "data-line:connect-req", which is a data communication line connection request instruction message, from "Refer-To:<data-line:connect-req>" (M151) in the REFER message (M15) shown in FIG. 13 (F1511). The telephone communication processing unit 87 checks if the extracted information is a data communication line connection request instruction message (F1512) and, if the extracted information is a request instruction message (Y), transmits the 202 Accepted message to the SIP/DNS server 4 as an acceptance response to the data communication line connection request instruction (F1513).

If the message is not a request instruction message (N) in step F1512, the telephone communication processing unit 87 transmits the BYE message, which is a disconnection message, to the SIP/DNS server 4 (F1514).

The 202 Accepted message is transferred to the SIP/DNS server 4 as "202 Accepted" (SQ16).

If the received "202 Accepted" (SQ16) is addressed to the SIP/DNS server 4 and its content is valid, the SIP/DNS server 4 transfers BYE (SQ17) to the router-n(8-*n*) to perform the disconnection processing.

If the received BYE (SQ17) is addressed to the router 8-*n* and its content is valid, the router 8-*n* transfers 200 OK (SQ18) to the SIP/DNS server 4.

If the data communication line connection request instruction is accepted during the data communication connection request acceptance processing (indicated by F151), the router 8-*n* performs the PPPoE connection processing (SQ19) and the PPP connection processing (SQ20-1) between the router 8-*n* and the GW 9 to connect the data communication line. During the PPP connection processing (SQ20-1), the GW 9 transmits Access-req to the RADIUS server 10 as an authentication request message for the router 8-*n* (SQ20-2). If the authentication succeeds, the RADIUS server 10 sets the data communication line IP address 10.0.1.1, assigned to the router 8-*n*, in Access-accept and transmits Access-accept to the GW 9 (SQ20-3). The GW 9 extracts the data communication line IP address 10.0.1.1, which is set in the received Access-accept, and performs the PPP connection processing (SQ20-1) to assign the data communication line IP address 10.0.1.1 to the router 8-*n*.

When the data communication line is connected successfully by the PPP connection processing (SQ20), the router 8-*n* can carry out the data communication using the data communication line IP address 10.0.1.1 assigned by the GW 9.

FIG. 14 is a diagram showing an example of the description of a PUBLISH message.

The telephone communication processing unit 87 of the router 8-*n* performs the data communication connection status notification processing (indicated by F21) to notify the SIP/DNS server 4 that the data communication line has been connected. During the data communication connection status notification processing (indicated by F21), the telephone communication processing unit 87 checks if the data communication line is connected or disconnected (F211) as shown in FIG. 9. In this case, because the data communication line has been connected by the PPP connection processing (SQ20), it is determined that the data communication line is connected (Y). And, as shown in FIG. 14, the telephone communication processing unit 87 sets the following information (F212) in the status information (Event field) of the PUBLISH message (M21), that is, "connect" as the status information and the IP address, which is assigned to the data communication line, as the data communication line IP address information (for example, "Event:connect:IP4=10.0.1.1 (M211)), and then transmits the PUBLISH message (M21) to the SIP/DNS server 4 (F213).

The PUBLISH message (M21) is transferred to the SIP/DNS server 4 as PUBLISH (connect/IP4:10.0.1.1) (SQ21).

When the SIP/DNS server 4 receives PUBLISH (connect/IP4:10.0.1.1) (SQ21), the SIP processing unit 44 performs the data communication connection status acceptance processing (indicated by F31). During the data communication connection status acceptance processing (indicated by F31), the SIP processing unit 44 extracts the information (M211) from the received PUBLISH message (M21) as shown in FIG. 11, that is, the SIP URI information "user-n@aaa.com" from the transmission source information (From field) and the data communication line connection status "connect" and the data communication line IP address "10.0.1.1" from the status information (Event field) (F311), and then searches the SIP URI column 471 of the SIP user status management table 47, shown in FIG. 6B, for the extracted SIP URI "user-n@aaa.com" (F312). If a matching SIP URI is found (Y), the SIP processing unit 44 sets the information (475) in the SLP user status management table 47 (F314), that is, "connect" in the status 472 and "IP4=10.0.1.1" in the IP address 473, as shown in FIG. 6C. After that, the SIP processing unit 44 transmits the 200 OK message (F315).

The 200 OK message is transferred to the router 8-n as 200 OK (SQ22).

In addition, the SIP/DNS server 4 transmits the data communication line IP address "10.0.1.1" as the DNS response message to the IP terminal 2-2.

The response message is transferred to the IP terminal 2-2 as "response (IP4:10.0.1.1)" (SQ23).

When "response (IP4:10.0.1.1)" (SQ23) is received, the IP terminal 2-2 extracts the data communication line IP address "10.0.1.1" from the response message and carries out communication (SQ24), usually via HTTP, between the IP terminal 2-2 and the public web server 3.

FIG. 15 is a diagram showing an example of the sequence in which, after the communication between the IP terminal 2-2 and the public web server 3 is terminated, the router 8-n performs the data communication line disconnection processing for the GW 9 and transmits a disconnection notification to the SIP/DNS server 4.

The router 8-n performs the connection time monitoring processing, such as non-communication time monitoring and connection elapsed time monitoring, via the processing unit 883.

For the non-communication time monitoring, the router 8-n performs the PPP disconnection processing (SQ25) for the GW 9, for example, when the HTTP communication (SQ24) is terminated and, after that, the non-communication state lasts for a pre-set time (T24) and then transmits PDAT (SQ26).

For the connection elapsed time monitoring, the router 8-n performs the PPP disconnection processing (SQ25) for the GW 9, for example, when a pre-set time has elapsed even during the HTTP communication (SQ24), and transmits PADT (SQ26).

When a change in the data communication line state from "connect" to "disconnect" is detected, the processing unit F21 of the router 8-n, which performs the data communication connection status notification processing, transmits "PUBLISH (disconnect)" (SQ27) to the SIP/DNS server 4.

When PUBLISH (disconnect) (SQ27) is received, the processing unit F31 of the SIP/DNS server 4, which performs the data communication connection status acceptance processing, changes the information in the status 472 of #3 in the SIP user status management table 47 to "disconnect" (476) as shown in FIG. 6D.

Although the combination of PPPoE and PPP is used as the data communication line connection control protocol in the description above, the present invention is applicable also to the combination of 802.1X and DHCP or to the connection control protocol such as IPsec in the same way as to the combination of PPPoE and PPP.

Although the SIP/DNS server is described as one control server in the description above, the present invention is applicable also to the configuration, in which there are two servers, SIP server and DNS server, and the SIP server and the DNS server communicate with each other via internal communication, in the same way as to the configuration in which there is one control server. In addition, the GW 9 is installed separately from the control server in the configuration described above, the GW 9 may be included the control server. That is, it is possible to provide a processing unit, which processes the GW 9 function, in the control server instead of providing a standalone GW.

The embodiment of the present invention may also have the configuration described below.

In a communication system in which a home router, which is accommodated in multiple IP terminals and multiple packet transfer devices, and a session control management server are connected, the home router comprises a telephone line connection interface, an IP terminal connection LAN interface, a public server connection interface, and an IP network connection WAN interface. The IP network connection WAN interface distinguishes between an IP phone connection line and a data communication line. The IP phone line is constantly registered in the session control management server, while the data communication line is monitored for the connection time and is disconnected from the packet transfer device. The session control management server comprises a name management table in which information on an FQDN, a data communication line IP address, a dynamic DNS, and a SIP URI is stored, a connection management table in which information on a SIP URI and a telephone line IP address is stored, and a user status management table in which a SIP URI, a status indicating a "calling" or "disconnect" status, and a data communication line IP address that is set when the status is "connect". The session control management server extracts an FQDN from a name resolution message received from an IP terminal, references the name management table according to the FQDN information, references the user status management table according to the SIP URI information if the SIP URI information is stored, further references the connection management table based on the SIP URI information if the information indicating "disconnect" is stored in the status, and performs the session connection processing for, and transmits a data communication line connection request instruction to, the home router corresponding to the telephone line IP address if information on the telephone line IP address is stored. The home router performs the session connection processing for the packet transfer device and notifies the session control management server about the data communication line connection status and the data communication line IP address. The session control management server accepts the data communication line connection status notification and the data communication line IP address notification, transmits the data communication line IP address for the FQDN as a response message to the IP terminal, and establishes a communication path between the IP phone and the public server connected to the home router.

In the configuration described above, the session control management server may reference the user status management table according to the SIP URI information, reference the connection management table based on the SIP URI information if information indicating "disconnect" is stored in the status and, if the telephone line IP address information is stored, perform the session connection processing for, and transmit a data communication line connection request instruction to, the home router corresponding to the telephone line IP address.

When the data communication line connection request instruction transmitted from the session control management server is recognized, the home router may perform the connection processing for the packet transfer device.

If the connection status of the data communication line is changed from "disconnect" to "connect" or from "connect" to "disconnect", the home router may notify the session control management server about the data communication line connection status.

The session control management server may extract the data communication line connection status notified by the home router and register the status and the data communication line IP address in the user status management table.

The session control management server may transmit the data communication line IP address, notified by the home router, as a response to the IP terminal.

Another example of the configuration is a communication system in which a home router, which is accommodated in multiple IP terminals and multiple packet transfer devices, and a session control management server are connected. The session control management server comprises a name management table in which information on an FQDN, a data communication IP address, a dynamic DNS, and a SIP URI is stored, a connection management table in which information on a SIP URI and a telephone line IP address is stored, and a user status management table in which a SIP URI, a status indicating "calling" or "disconnect", and a data communication line IP address that is set when the status is "connect". The session control management server extracts an FQDN from a name resolution message received from an IP terminal, references the name management table according to the FQDN information, references the user status management table according to the SIP URI information if the SIP URI information is stored, further references the connection management table based on the SIP URI information if the information indicating "disconnect" is stored in the status, and performs the session connection processing for, and transmits a data communication line connection request instruction to, the home router corresponding to the telephone line IP address if information on the telephone line IP address is stored. The home router performs the session connection processing for the packet transfer device and notifies the session control management server about the data communication line connection status and the data communication line IP address. The session control management server accepts the data communication line connection status notification and the data communication line IP address notification, transmits the data communication line IP address for the FQDN as a response message to the IP terminal, and establishes a communication path between the IP phone and the public server connected to the home server.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system comprising:
a router and a control server, said router accommodating a telephone terminal, an internet protocol (IP) terminal, and an application server,
wherein
said router comprises:
a first interface to said IP terminal;
a second interface to said telephone terminal;
a third interface to said application server; and
a fourth interface that accommodates a voice communication line and a data communication line connected to said control server, said control server comprises:
a name management table in which a mapping among a domain name of said application server, a data communication line IP address of said router, and a session initiation protocol-uniform resource identifier (SIP-URI) is stored;
a domain name system (DNS) processing unit configured to access the name management table and to perform processing for establishing a correspondence among the domain name of said application server, the data communication line IP address of said router, and the SIP-URI;
a status management table in which a mapping among a session status information on said router, the data communication line IP address, and the SIP-URI is stored;
a SIP processing unit configured to access the status management table and to perform processing for controlling a session with said router and for establishing a correspondence among session status information on said router, the data communication line IP address, and the SIP-URI;
wherein, said DNS processing unit is configured to search the name management table for a SIP-URI corresponding to destination information included in a name resolution request transmitted from said IP terminal, and
wherein said SIP processing unit is configured to search the status management table for the session status information corresponding to the SIP-URI found by the DNS processing unit from the name management table, wherein the SIP processing unit is configured to connect a session with said router via a voice communication line when the session status information that has been searched for in the status management table includes information indicating "disconnect", and to transmit a connection request, which requests to connect to the data communication line to said router.

2. The communication system according to claim 1, further comprising:
a connection management table in which a correspondence among a voice communication line IP address of said router and the SIP-URI is stored wherein
said SIP processing unit searches the connection management table for a voice communication line IP address of said router corresponding to the SIP-URI and performs the session connection processing with said router for the voice communication line IP address that has been searched for.

3. The communication system according to claim 2 wherein said router regularly transmits a registration request to said control server and, in response to the registration request, said SIP processing unit registers the voice communication line IP address and the SIP-URI into the connection management table.

4. The communication system according to claim 1 wherein the destination information is a domain name.

5. The communication system according to claim 1 wherein the destination information is an FQDN.

6. The communication system according to claim 1 wherein after the data communication line between said router and said control server is connected, said SIP processing unit updates the status management table using one of session status connect information and session status disconnect information and the data communication line IP address included in a status notification message transmitted from said router.

7. The communication system according to claim 1 wherein the data communication line IP address is assigned to said router for assignment to the data communication line.

8. The communication system according to claim 1 wherein said DNS processing unit includes the data communication line IP address, which is set in the status management table by said SIP processing unit, into a response message to the name resolution request.

9. The communication system according to claim 1 wherein said router disconnects the data communication line based on connection time monitoring of the data communication line.

10. The communication system according to claim 1 wherein the name management table stores the SIP-URI corresponding to the destination information.

11. The communication system according to claim 1 wherein the connection request message includes a data communication line connection request instruction to be transmitted to said router.

12. The communication system according to claim 1, further comprising a device installed between said router and said control server to terminate data communication with said router.

13. The communication system according to claim 1 wherein said control server further comprises a processing unit that terminates data communication with said router.

14. A control server that controls a communication between an internet protocol (IPI terminal and an application server accommodated by a router,
said control server comprising:
a name management table in which a mapping among a domain name of said application server, a data communication line IP address of said router, and a session initiation protocol-uniform resource identifier (SIP-URI) is stored;
a domain name system (DNS) processing unit configured to access the name management table and to perform processing for establishing a correspondence among the domain name of said application server, the data communication line IP address of said router, and the SIP-URI;
a status management table in which a mapping among a session status information on said router, the data communication line IP address, and the SIP-URI is stored;
a SIP processing unit configured to access the status management table and to perform processing for controlling a session with said router and for establishing a correspondence among session status information on said router, data communication line IP address, and SIP-URI;
wherein, said DNS processing unit is configured to search the name management table for a SIP-URI found by the DNS processing unit corresponding to destination information, included in a name resolution request transmitted from said IP terminal, and
wherein said SIP processing unit is configured to search the status management table for the session status information corresponding to the SIP-URI obtained from the name management table,
wherein the SIP processing unit is configured to connect a session with said router via a voice communication line when the session status information that has been searched for includes information indicating "disconnect", and to transmit a connection request, which requests to connect to the data communication line to said router.

15. The control server according to claim 14, further comprising:
a connection management table in which a correspondence among a voice communication line IP address of said router and the SIP-URI is stored
wherein said SIP processing unit searches the connection management table for a voice communication line IP address of said router corresponding to the SIP-URI and performs the session connection processing with said router for the voice communication line IP address that has been searched for.

16. The control server according to claim 14 wherein
after the data communication line between said router and said control server is connected, said SIP processing unit updates the status management table using one of session status connect information and session status disconnect information and the data communication line IP address included in a status notification message transmitted from said router.

17. The control server according to claim 14 wherein
said DNS processing unit includes the data communication line IP address, which is set in the status management table by said SIP processing unit, into a response message to the name resolution request.

18. The control server according to claim 14 further comprising a processing unit that terminates data communication with said router.

* * * * *